Oct. 8, 1968   P. VALENTI   3,404,580
BALL SCREW ACTUATOR
Filed April 18, 1967   2 Sheets-Sheet 1
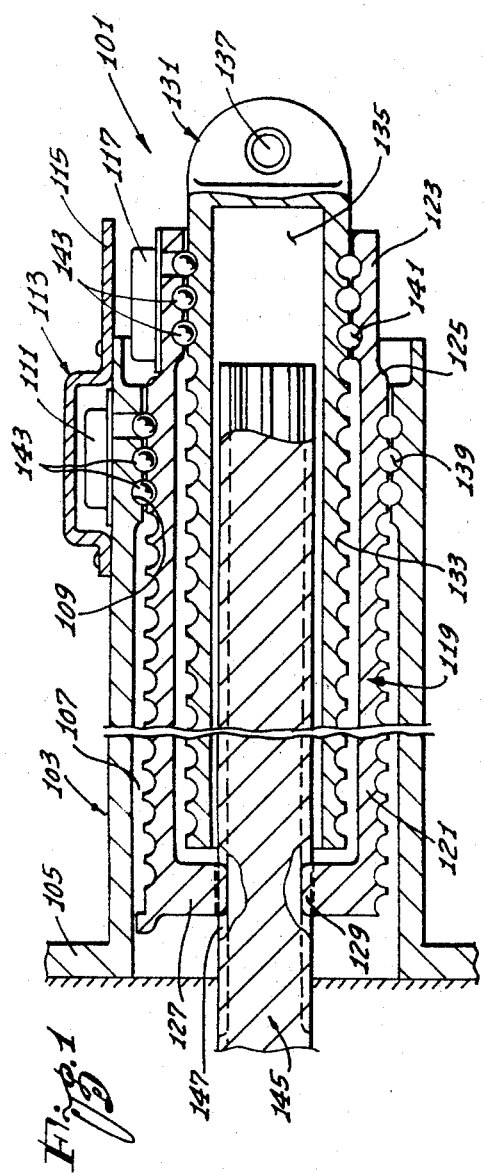
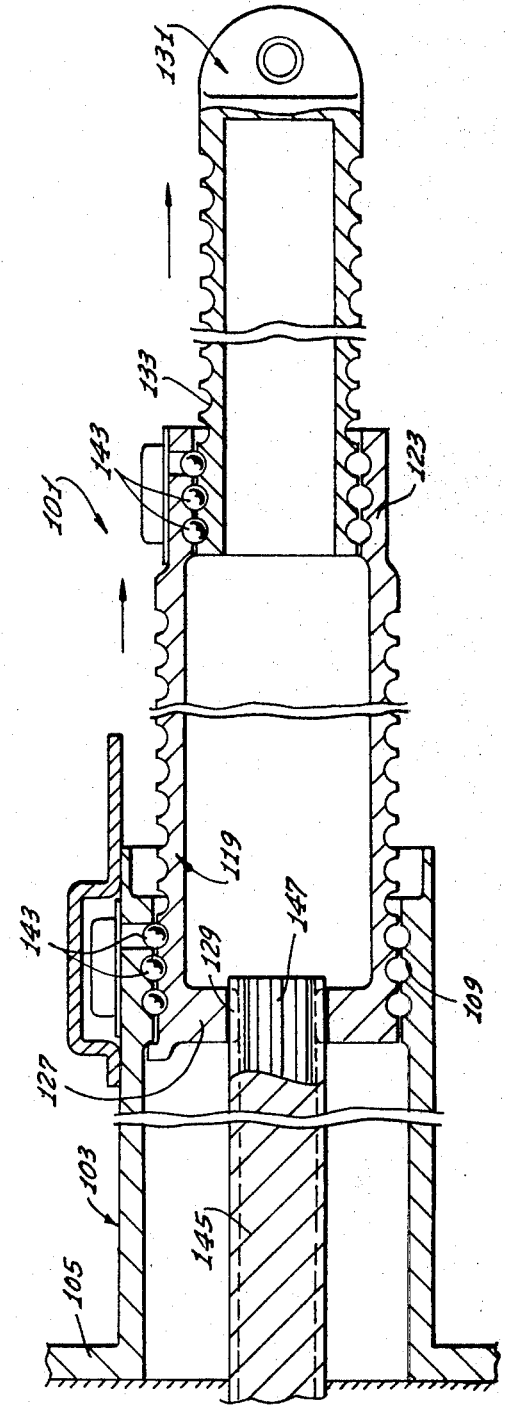
INVENTOR:
Peter Valenti
ATTORNEYS

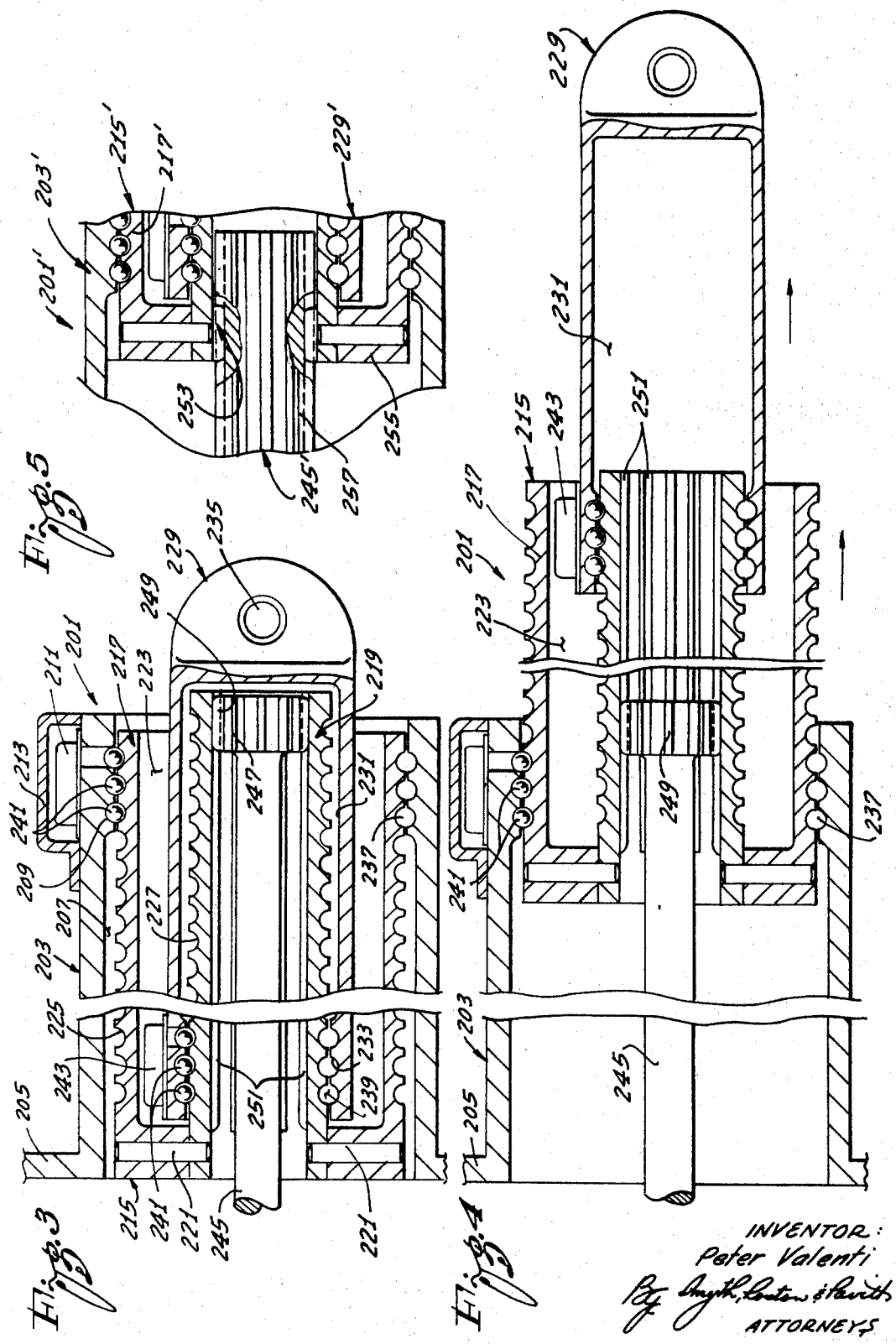

United States Patent Office 3,404,580
Patented Oct. 8, 1968

3,404,580
BALL SCREW ACTUATOR
Peter Valenti, Whittier, Calif., assignor to Sargent Industries, Inc., a corporation of Delaware
Filed Apr. 18, 1967, Ser. No. 631,624
9 Claims. (Cl. 74—424.8)

ABSTRACT OF THE DISCLOSURE

This disclosure describes a ball screw actuator which includes a nonrotary nut, a rotatable and translatable member, a translatable member, and a rotary input member drivingly connected to the rotatable and translatable member. The members of the ball screw actuator define races for sets of balls to permit low friction movement between adjacent members. Rotation of the rotary input member moves the members between an extended and a retracted position.

Background of the invention

This invention relates to extendible actuators and more particulaly to ball screw actuators. A typical ball screw actuator of the type to which the present invention is directed includes various arrangements of nut and screw members arranged to efficiently convert rotary input motion into linear translatory motion. Confronting surface portions of adjacent nut and screw members are grooved to provide races for sets of balls. Upon rotation of one of the members, the balls associated therewith circulate in the race and through a return tube provided on the exterior of the nut. Rotation of the appropriate member of the device will cause either extension or retraction of the actuator.

Ball screw actuators of this type are used generally to convert rotary motion into linear motion or to convert linear motion to rotary motion with high efficiency. Ball screw actuators are also useful in obtaining substantial speed reduction with high efficiency. Ball screw actuators may be used, for example, in automotive steering systems, in landing gear for aircraft, for various purposes at missile launching sites, etc.

Ball screw actuators are frequently used in hostile areas, i.e., those areas in which there is a substantial danger of damaging the device. For example, when a ball screw actuator is used in connection with landing gear, it may be struck with rocks or other debris upon landing. In other instances, the ball screw actuator is exposed to the damaging effects of the weather. It is necessary, therefore, to protect the delicate regions of the device from damage from various causes.

The regions of the ball screw actuator most in need of shielding are the return tubes and the external grooves on the screw. Many prior art devices afford little or no protection for these relatively delicate regions of the ball screw actuator. Other prior art devices provide special or cumbersome shielding devices which are not particularly effective in thoroughly protecting the device.

Ball screw actuators are driven either internally or externally. With an external drive, a tubular rotary input member having relatively short internal splines engages external splines on the outer surface of an actuator member. The advantage of this construction is that the relatively long external splines are easy to machine. However, with the external drive the rotary input member must be of relatively large diameter and therefore additional weight is added to the actuator. For some applications, including those in which a weight penalty is undesirable, it is preferable to use an internal drive. When an internal drive is used, the rotary input member is of relatively small diameter for a given size actuator and carries short external splines which cooperate with long internal splines on the intermediate member. This materially reduces the weight of the actuator. However, because the internal splines are of substantial length, it becomes more difficult to manufacture the actuator because such internal splines are difficult to machine.

Summary of the invention

The present invention provides convenient and economic means for shielding of the sensitve areas of the ball screw actuator. With the present invention, all of the external grooves on the various members of the device are housed within an inner nonrotary nut in the retracted position of the device to prevent damage or contamination to the grooves. Further, one of the return tubes is fixed to a nonrotary nut. As the nonrotary nut is fixed to a support, this return tube is not extended into areas in which it is likely that damage may be caused thereto. The present invention also provides a drive system for a ball screw actuator which has the advantages of both an internal and an external drive.

Ball screw actuators of the present invention preferably include one or more races defined by internal and external grooves on the cooperating nut and screw portions. Each of these races contains a set of balls which circulate therethrough when the nut and screw members are rotated relative to each other. Return tubes are provided to recirculate the balls in the conventional manner.

The teachings of this invention can be embodied in a ball screw actuator including a nonrotary member, a rotary translatable member, and a nonrotary translatable member interconnected by suitable nut and screw portions and drivable by a rotary input member between extended and retracted positions. In the extended position the nonrotary member, which is usually fixed to a support and the nonrotary translatable member are interconnected by the rotary and traslatable member and form end portions of the device while the rotary translatable member forms an intermediate section of the elongated actuator. Thus, the nonrotary member, the rotary translatable member, and the nonrotary translatable member may be considered as inner, intermediate and outer members, respectively, as such terms define the relative axial distances from each of the members when in the extended position to the body to which the inner member is fixed.

One feature of the present invention is to provide a ball screw actuator which has the advantages of both an internal and an external drive. The rotary input member drives the rotary translatable member internally and is of relatively small diameter to provide a low weight drive. Relatively long splines, which are easily machined, are formed externally on the rotary input member. The rotary translatable member is provided with an annular flange extending radially inwardly from the inner end thereof. The inner surface in the radial direction of the annular flange is provided with relatively short internal splines which mesh with the relatively long external splines on the rotary input member. With this arrangement, ease of manufacture and low weight are obtainable. Furthermore, this feature of the invetion does not preclude fully retracting the actuator, as the outermost member contains a recess which receives the rotary input member in the collapsed or retracted position of the actuator.

Another feature of the present invention is to thoroughly guard and protect the sensitive areas of the actuator. This is accomplished in part by housing of the externally grooved portions of the varous members one within the other in the retracted position of the actuator. Preferably, the nonrotary member is not grooved externally and so all of the externally threaded members can be conveniently housed therein in the retracted position of the actuator.

To further protect the sensitive areas of the actuator, guards or shields may be provided over the return tubes. One of the return tubes is preferably mounted on the the stationary nonrotary member so that it need not be moved. This return tube can be conveniently provided with a shield or other guard which is detachably secured to the nonrotary member.

According to one embodiment of the present invention, the second or outermost return tube moves in an elongated axially extending recess in the rotary translatable member between the extended and retracted positions. Thus the rotary translatable member shields the return tube in both the extended and retracted positions. The rotary translatable member may have concentric radially spaced sleeves which define the axially extending recess. The external surfaces of each of these sleeves can be appropriately grooved to form screw portions which are received within a pair of nonrotary nuts, respectively.

The invention, both as to its organization and method of operation, together with further features and advantages thereof, may best be understood by reference to the following description taken in connection with the accompanying drawings.

Brief description of the drawings

FIG. 1 is a longitudinal sectional view through one form of ball screw actuator constructed in accordance with the teachings of this invention with the actuator being illustrated in the retracted position.

FIG. 2 is a longitudinal sectional view through the actuator of FIG. 1 with the actuator being illustrated in the extended position.

FIG. 3 is a longitudinal sectional view through a second embodiment of ball screw actuator with the actuator being illustrated in the retracted position.

FIG. 4 is a longitudinal sectional view through the ball screw autuator of FIG. 3 with the actuator being illustrated in the extended position.

FIG. 5 is a fragmentary sectional view illustrating how the embodiment of FIGS. 3 and 4 can be modified to contain substantially long external splines on the rotary input member.

Description of the preferred embodiments

Referring to the drawings and in particular to FIGS. 1 and 2 thereof, reference numeral 101 designates one form of a ball screw actuator constructed in accordance with the teachings of the present invention. The ball screw actuator 101 is relatively easy to manufacture in that relatively long driving splines are formed on an external member and yet the device is relatively lightweight in that the drive is internal. Furthermore, the actuator 101 provides thorough self-shielding on the sensitive areas thereof.

The actuator 101 includes an inner nonrotary nut 103 which is fixed to a support 105 which prevents the nut 103 from rotating or translating with respect thereto. The nut 103 has a relatively large diameter cylindrical passageway 107 extending therethrough and is provided with internal spiral grooves 109 at the outer end thereof. Return tube means 111 is secured to the exterior of the inner nut 103 adjacent the outer end thereof. Thus, the relatively delicate return tube means 111 is stationary throughout the operation of the actuator 101 and is not normally extended into hazardous areas. However, to further protect the return tube means 111, a guard or shield 113, preferably of a heavy-duty material, is suitably detachably secured to the inner nut 103. The shield 113 completely encloses the return tube means 111 and is provided with an annular extension 115 for protecting a second return tube means 117 in the retracted position of the actuator 101.

The actuator 101 also includes a rotary translatable member or tubular intermediate member 119 have a relatively long inner screw portion 121 and a relatively short outer nut portion 123 with the screw portion being received within the nut 103. The intermediate member 119 has a shoulder 125 which forms a transition between the relatively large diameter screw portion 121 and the relatively small diameter nut portion 123.

The intermediate member 119 has an annular flange 127 extending radially inwardly toward the central axis of the actuator from the inner end of the tubular member 119. A plurality of relatively short internal driven splines 129 are formed on the radial inward surface of the annular flange 127.

A nonrotary translatable member or outer nonrotary screw 131 is received within the nut portion 123 of the intermediate member 119. The outer nonrotary screw has spiral external grooves 133 extending substantially along the full axial length thereof and an axial cylindrical recess 135 opening toward the support 105. The outer nonrotary screw 131 has attachement means 137 for securing the screw 131 to an external actuatable member (not shown) which holds the screw 131 against rotation but which permits translatory movement thereof to actuate the actuatable member.

The groves 109 and the screw portion 121 define a first race 139 and the nut portion 123 and the groves 133 form a second race 141. Each of the races 139 and 141 contain a plurality of balls 143 and the return tube means 111 and 117 are provided for recirculating the balls of the races 139 and 141, respectively.

The actuator 101 has a relatively small rotary input member 145 for operating the actuator. The rotary input member 145 is mounted for rotation by suitable bearings (not shown) and is held against translation. The rotary input member 145 has relatively long axially extending splines 147 formed thereon for drivingly engaging the relatively short internal splines 129 on the intermediate member 119. The rotary input member 145 may be tubular to reduce the weight thereof and is substantially long to allow the desired amount of extension of the intermediate member 119.

As shown in FIG. 1, in the retracted position the rotary input member 145 is telescoped within the outer nonrotary screw 131 and the splines 147 are in driving engagement with the splines 129. The outer nonrotary screw 131 is telescoped within the intermediate member 119 which in turn is telescoped within the inner nonrotary nut 103. Thus, the inner nonrotary nut 103 houses all of the elements of the device and all of the external grooves or screw portions of the actuator are covered and protected when the actuator is in the retracted position. Furthermore, in the retracted position, the return tube means 117 is shielded by the annular extension 115 of the shield 113.

In the operation of the embodiment of FIGS. 1 and 2, rotary motion is imparted to the rotary input member 145 to cause rotation thereof. The rotary input member 145 drives the intermediate member 119 through the splines 147 and 129. As the inner nonrotary nut 103 is held against rotation and translation by the support 105, the intermediate member 119 rotates relative thereto to cause the screw portion 121 to cooperate with the balls 143 and the grooves 109 to translate the intermediate member 119 axially outwardly toward the position shown in FIG. 2. Similarly, as the outer nonrotary screw 131 is held against rotation, the intermediate member 119 rotates relative thereto to allow the nut portion 123 to cooperate with the balls 143 and the grooves 133 to simultaneously move the outer nonrotary screw 131 axially outwardly toward the position shown in FIG. 6. By counter-rotating the rotary input member 145, the actuator 101 may be moved from the extended position of FIG. 2 to the retracted position of FIG. 1.

With respect to the embodiment of FIGS. 1 and 2, it is important to note that the relatively long splines, i.e., the splines 147, are formed externally on the rotary input member, while the internal splines 129 has a relatively short axial length, and accordingly, the actuator 101 is very easy to manufacture. Furthermore, the actuator 101 has an internal drive and this permits the rotary input member 145 to be of relatively small diameter to reduce the weight and size of the actuator. Of course, the rotary input member 145 must be of sufficient strength to impart the desired torque to the intermediate member 119.

FIGS. 3 and 4 show a ball screw actuator 201 representing a second embodiment of the present invention. The actuator 201 is similar to the actuator 101 in that both provide for shielding of the sensitive regions of the actuator in the retracted position; however, the actuator 201 further provides for complete shielding of the outermost return tube means in the extended position of the actuator.

The actuator 201 includes an inner nonrotary nut 203 which is fixed to a suitable support 205 to prevent the nut from rotating or translating relative to the support. The inner non-rotary nut 203 has a relatively large diameter axial cylindrical passageway 207 extending therethrough with spiral internal grooves 209 formed in the outer end of the passageway. Return tube means 211 is secured to the exterior surface of the nut 203 adjacent the outer end thereof. A shield 213, preferably constructed of heavy duty material, is detachably secured to the nut 203 and serves to protect the return tube means 211 against damage.

Although the nut 203 is substantially identical to the nut 103, the actuator 201 has an intermediate member or rotary translatable member 215 which is structurally and functionally different from the intermediate member 119. The intermediate member 215 includes an outer cylindrical sleeve 217 and an inner cylindrical sleeve 219. The sleeves 217 and 219 are rigidly secured together by suitable means, such as a plurality of pins 221, which holds the sleeves in spaced concentric relationship. The sleeves 217 and 219 define an axially extending recess 223 of generally annular cross section.

The outer sleeve 217 has spiral external grooves 225 thereon and the inner sleeve 219 has spiral external grooves 227 thereon. Thus, the intermediate member 215 has two screw portions and no nut portion.

The actuator 201 also includes an outer non-rotary nut or nonrotary translatable member 229 which has an axial cylindrical recess 231 therein opening toward the support 205. The nut 229 has internal spiral grooves 233 and in the retracted position is substantially completely received within the recess 223 in the intermediate member 215. The outer nonrotary nut 229 has attachment means 235 for securing the nut 229 to an actuatable member which prevents the nut 229 from rotating, but allows it to translate to actuate the actuatable member.

The grooves 209 and 225 define a first race 237 and the grooves 233 and the grooves 227 form a second race 239. Each of the races 237 and 239 carry a plurality of balls 241 and the return tube means 211 allows force circulation of the balls 241 in the race 237 and a second return tube means 243 allows for recirculation of the balls in the race 239.

The actuator 201 is provided with an internal drive which includes a rotary input member 245 which is driven in rotation by a suitable drive mechanism (not shown). In the embodiment shown, the input member 245 is a relatively small diameter solid shaft having an enlarged outer end portion 247 on which is formed relatively short longitudinally extending external splines 249. The splines 249 cooperate with relatively long longitudinally extending internal splines 251 formed on the interior surface of the sleeve 219 of the intermediate member 215.

In the retracted position shown in FIG. 3, the rotary input member 245 is telescoped within the sleeve 219 and the splines 249 and 251 are in driving engagement with each other. The outer nonrotary nut is substantially completely received within the recess 223 in the intermediate member 215 and the intermediate member is telescoped within the inner nonrotary nut 203. Thus, the inner nonrotary nut 203 houses all of the basic elements of the actuator and protects all of the external grooves.

To move the actuator 201 between the retracted position of FIG. 3 and the extended position of FIG. 4, the rotary input member 245 is rotated to drive the intermediate member 215 in rotation through the splines 249 and 251. As the nut 203 is held against rotation by the support 205, the intermediate member 215 rotates relative thereto to cause the balls 241 and the race 237 to move the intermediate member 215 axially outwardly with respect to the nut 203. Similarly, the outer nonrotary nut 229 is held against rotation so that the intermediate member rotates relative thereto to simultaneously move the outer nonrotary nut 229 axially outwardly to the position shown in FIG. 4. The splines 251 on the intermediate member 215 are of sufficient length to allow complete extension of the intermediate member.

It is important to note that the return tube means 243 remains within the recess 223 even when the actuator 201 is in the extended position thereof as shown in FIG. 4. Thus, the outer sleeve 217 serves to shield the return tube means 243 regardless of whether the actuator is extended or retracted. Thus, the embodiment of FIGS. 3 and 4 is particularly useful for those applications in which there is substantial danger of damaging the return tube means 243.

FIG. 5 illustrates an actuator 201 which is identical to the actuator 201 except that the former is modified to provide external splines on a rotary input member 245'. Elements of the actuator 201' that correspond to the elements of the actuator 201 are designated by corresponding primed reference characters.

The actuator 201' has an inner nonrotary nut 203' which is identical to the nut 203. The actuator 201' also has an intermediate member 215' which is identical to the intermediate member 215 except that the former is provided with relatively short interval splines 253 at the inner end thereof. The splines 253 are thus quite similar to the splines 129 (FIGS. 1 and 2) which are provided on the annular flange 127. A portion 255 of the intermediate member 215' between the outer sleeve 217' and the splines 253 constitutes a radially inwardly extending annular flange similar to the annular flange 127.

The actuator 201' has an outer nonrotary nut 229' which is identical to the outer nonrotary nut 229. The rotary input member 245' is preferably tubular and has relatively long longitudinally extending splines 257 in driving engagement with the internal splines 253.

The operation of the modification shown in FIG. 5 is identical to the embodiment shown in FIGS. 3 and 4. It should be noted that the modification of FIG. 5 possesses the advantage of having the relatively long splines 257 formed externally on the rotary input member 245'. As explained above, this materially facilitates fabrication of the actuator.

Although exemplary embodiments of the invention have been shown and described, many changes, modifications and substitutions may be made by one having ordinary skill in the art without necessarily departing from the spirit and scope of this invention.

I claim:

1. In an extendable actuator attachable to a support and to an actuable member, the combination of:

a nonrotary nut fixed to the support;

a rotary and translatable tubular member having a screw portion received within said nonrotary nut for cooperation therewith, said rotary and translatable tubular member also having relatively large axially extending internal splines thereon projecting inwardly toward the longitudinal axis of the actuator;

a translatable nonrotary member mounted on said rotary and translatable tubular member for cooperation therewith;

means on said rotary and translatable tubular member and said translatable nonrotary member responsive to rotation of said rotary and translatable tubular member to move said translatable nonrotary member axially relative to said rotary and translatable tubular member; and a rotary input member having relatively long external splines thereon projecting into said rotary and translatable tubular member and drivingly engageable with said internal splines whereby rotation of said rotary input member moves said rotary and translatable tubular member and said translatable nonrotary member axially relative to said nonrotary nut between extended and retracted positions.

2. A combination as defined in claim 1 wherein said rotary and translatable tubular member includes an annular flange adjacent the inner end of said rotary and translatable tubular member, said annular flange extending inwardly toward the longitudinal axis of the actuator and carrying said internal splines thereon.

3. A combination as defined in claim 1 wherein said tubular member defines a recess into which said translatable nonrotary member is substantially completely received in said retracted position.

4. In an extendible actuator attachable to a support and an actuable member, the combination of:

a nonrotary nut fixed to said support;

a tubular intermediate member having an inner screw portion, an outer nut portion, and an annular flange projecting radially inwardly and carrying internal splines, said inner screw portion being rotatably received in said nonrotary nut;

a nonrotary screw having an inwardly directed axial recess, said nonrotary screw being received by said outer nut portion of said tubular intermediate member; and a rotary input member having longitudinally extending external splines thereon projecting into the interior of said tubular intermediate member with said external splines on said rotary input member being engageable with said internal splines on said annular flange whereby rotation of said rotary input member moves said intermediate member and said nonrotary screw generally axially between a retracted position in which said nonrotary nut houses said intermediate member, said nonrotary screw and said rotary input member and an extended position in which said intermediate member and said nonrotary screw are extended out of said nonrotary nut, said external splines being substantially longer than the internal splines.

5. A combination as defined in claim 4 wherein portions of said nonrotary nut and said tubular intermediate member define a race and a plurality of balls are disposed in said race, and a return tube means for said balls is secured to said nonrotary nut.

6. In an extendible ball screw actuator attachable to a support and to an actuator member, the combination of:

a nonrotary nut secured to the support;

an intermediate member having a screw portion received by said nonrotary nut, portions of said screw portion and said nonrotary nut defining a first race;

an outer nonrotary member adjacent said intermediate member and connectible to the actuator member;

means on said outer nonrotary member and said intermediate member defining a second race;

first and second sets of balls disposed in said first and second races, respectively;

first and second return tube means mounted on said nonrotary nut and one of said intermediate member and said outer nonrotary member, respectively;

a rotary input member drivingly engageable with said intermediate member to rotate said intermediate member to move said intermediate member and said outer nonrotary member between extended and retracted positions; and shield means on said nonrotary nut for covering said first and second return tube means when the intermediate member and the nonrotary member are retracted to protect said first and second return tube means.

7. In an extendible ball screw actuator attachable to a support and to an actuatable member, the combination of:

an inner nonrotary nut fixed to said support;

an intermediate member having first and second screw portions thereon, said first screw portion being rotatably received within said inner nonrotary nut;

an outer nonrotary nut, said second screw portion of said intermediate member being rotatably received within said outer nonrotary nut;

portions of said intermediate member and said outer nonrotary nut defining a race;

a set of balls in said race;

return tube means mounted on said outer nonrotary nut for providing a return path for said balls;

a rotary input member drivingly connected to said intermediate member whereby rotation of said rotary input member moves said intermediate member and said outer nonrotary nut generally axially between an extended position and a retracted position; and said intermediate member defining an elongated recess into which said return tube means is received in said extended and retracted positions.

8. A combination as defined in claim 7 wherein said recess is an elongated recess of generally annular cross section.

9. A combination as defined in claim 7 wherein said intermediate member includes inner and outer sleeve portions having second and first screw portions thereon, respectively, said inner sleeve being spaced radially inwardly from said outer sleeve to define said recess.

References Cited

UNITED STATES PATENTS 1,708,450   4/1929   May _____ 74—424.8

FOREIGN PATENTS 1,267,639   6/1961   France.

FRED C. MATTERN, Jr., *Primary Examiner.*

LEONARD H. GERIN, *Assistant Examiner.*